United States Patent [19]
Martin et al.

[11] Patent Number: 5,647,699
[45] Date of Patent: Jul. 15, 1997

[54] ROTARY CUTTER HEAD

[75] Inventors: Russ Martin; Ray Martin; Mike McMahon, all of Peshtigo, Wis.

[73] Assignee: Great Lakes Carbide Tool Manufacturing, Inc., Peshtigo, Wis.

[21] Appl. No.: 503,381

[22] Filed: Jul. 17, 1995

[51] Int. Cl.$^6$ .............................. B23D 13/00; B23C 5/22
[52] U.S. Cl. .................... 407/33; 144/230; 407/50; 83/845
[58] Field of Search .................... 407/33, 35, 40–43, 407/50, 91, 110, 49, 38, 47, 48, 117; 144/230, 231; 83/845

[56] References Cited

U.S. PATENT DOCUMENTS

| | | | |
|---|---|---|---|
| 3,688,367 | 9/1972 | Bennett | 407/43 |
| 4,557,305 | 12/1985 | Berger et al. | 144/230 |
| 5,059,068 | 10/1991 | Scott | 407/33 |
| 5,176,191 | 1/1993 | Owens | 407/41 |

FOREIGN PATENT DOCUMENTS 918710  10/1954  Germany .................... 144/230

Primary Examiner—M. Rachuba
Assistant Examiner—Kenneth J. Hansen
Attorney, Agent, or Firm—Leydig, Voit & Mayer, Ltd.

[57] ABSTRACT

A rotary cutter head includes integral clamping members for releasably securing cutting blades in recesses formed in the cutter head. Each clamping member is formed with a free end portion which defines one side of the recess. An end of the clamping member located oppositely of the free end portion is integrally connected to the cutter head and defines a resilient hinge portion. The free end portion is resiliently biased by the integral hinge portion to a position which allows the blade to be slidably received in the recess. Threaded fasteners are operable to cause the free end portion to pivot about the hinge portion and to drive the free end portion toward an oppositely located side of the recess so as to clamp the blade in the recess.

12 Claims, 2 Drawing Sheets

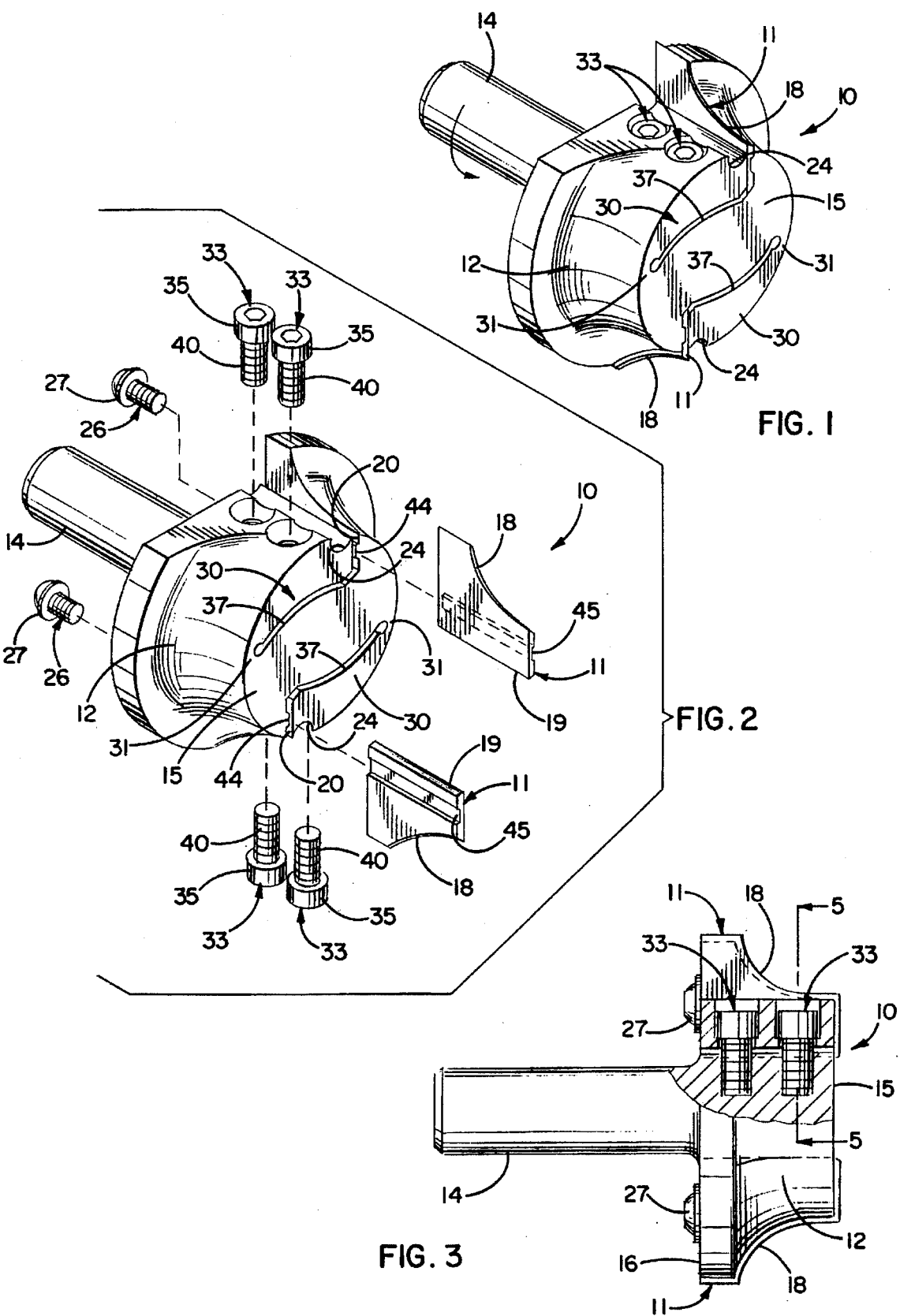

ROTARY CUTTER HEAD

BACKGROUND OF THE INVENTION

This invention relates generally to a cutting tool for use in a rotary power tool. More particularly, the invention relates to a rotary cutter head for releasably holding cutting blades formed with cutting edges which extend radially outwardly of and generally axially along the outer periphery of the cutter head. Cutter heads of this general type are typically used in power machines such as routers, edgebanders, or tenoners and are typically used to chamfer, round, or otherwise shape an edge portion of a workpiece of either ferrous or non-ferrous material.

In general, a cutter head of this type is formed with at least one recess for receiving a cutting blade. The recess extends generally radially inwardly from the outer periphery of the cutter head and extends substantially axially in the cutter head. Frequently, the recess extends across the entire width of the cutter head.

Prior cutter heads of this general type utilize threaded fasteners and a so-called gib to releasably secure the blade in the recess. The gib is shaped to generally conform to the shape of the recess and is sized to allow the gib and the blade to be slidably received in the recess. When installing a blade into the cutter head, the gib and the blade are manually located in the recess. The threaded fasteners are then screwed into threaded openings formed in the cutter head to draw the gib toward one side of the recess so as to wedge or otherwise clamp the blade in the recess. The blade and the gib used in these cutter heads must be manually aligned relative to one another and relative to the recess when they are installed into the recess. Moreover, this alignment must then be maintained until the gib and the blade are secured in the recess.

In one prior cutter head, the fasteners extend through openings formed in the gib, and the heads of the fasteners engaging the gib to secure the gib and the blade in the recess. In this instance, each time that the blade is changed, the gib and the fasteners must be removed from and reinstalled into the recess.

In another prior cutter head, the fasteners draw pins through openings formed in the gib. The pins are formed with enlarged heads which engage the gib and which wedge the gib and the blade in the recess. In this case, the gib and the pins need not be removed from the recess to change the blade. However, the gib and the blade must still be manually aligned as the fasteners are tightened. Moreover, the pins and the gib used in this cutter head easily fall out of the recess when the fasteners are inadvertently loosened too far.

The gib used in some prior cutter heads is formed with a fixed locating pin for establishing relative alignment between the gib and the blade. In such a cutter head, the locating pin is received into an opening formed in the blade before the gib and the blade are placed into the recess. While the fixed locating pin aids in establishing and maintaining alignment between the gib and the blade, the gib and the fasteners must be removed and reinstalled each time the blade is changed. Moreover, the gib and the blade must still be aligned relative to the recess.

In addition to a gib and the associated fasteners and pins, prior cutter heads are typically equipped with a back-up fastener to prevent the blade from flying out of the cutter head in the event that the gib loosens while the cutter head is rotating or in the event that the fasteners which secure the gib are not tightened before the machine is turned on. The back-up fastener extends through an opening in the blade and must either be backed out or completely removed from the cutter head before the blade can be removed from the recess. The back-up fastener must then either be turned inwardly or reinstalled when a new blade is installed in the cutter head.

In summary, while prior cutter heads utilize numerous arrangements to secure a cutting blade into a recess, each of these arrangements can lead to substantial downtime of a machine due to the time required to change the blades when the cutting edges of the blades become dull from use.

SUMMARY OF THE INVENTION

The general aim of the present invention is to provide a new and improved rotary cutter head in which cutting blades are more easily installed into and releasably secured in recesses formed in the cutter head in order to reduce the downtime when the blades are changed.

A detailed objective is to achieve the foregoing by providing a cutter head having integrally formed clamping portions which are operable to selectively clamp and release the cutting blades in the recesses as threaded fasteners engaging the clamping portions are turned inwardly and outwardly, respectively, in threaded openings formed in the cutter head.

A more detailed objective of the invention is to provide a resilient hinge portion which integrally connects each clamping portion with the cutter head and to further provide a clamping portion having a free end portion which defines one side of the recess and which is adapted to approach and recede from an oppositely located side of the recess as the clamping portion pivots inwardly and outwardly, respectively, about the hinge portion.

Another more detailed objective is to provide a hinge portion which is adapted to resiliently bias the free end portion of the clamping portion to a position such that a cutting blade may be slidably received in the recesses.

The invention also resides in the provision of uniquely configured recesses which are adapted to restrict radial movement of the cutting blades so as to prevent the blades from flying out of the cutter head in the event that the clamping portion loosens while the cutter head is rotating.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved rotary cutter head incorporating the unique features of the present invention and equipped with cutting blades.

FIG. 2 is an exploded perspective view of the cutter head.

FIG. 3 is a side view with certain portions being broken away and shown in cross-section.

Figure 4:
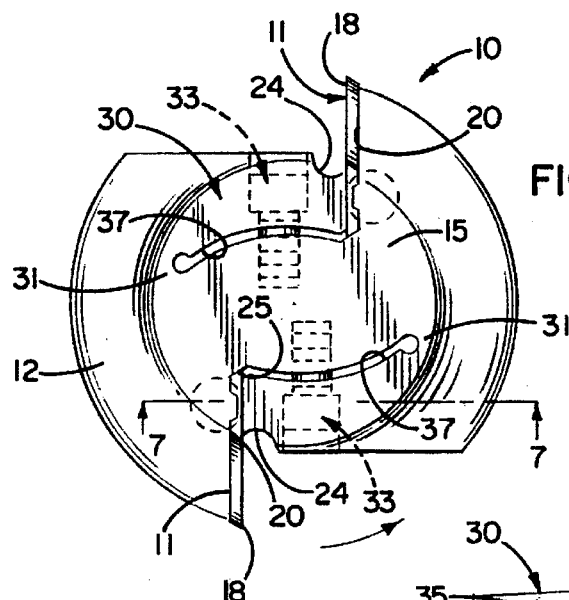
FIG. 4 is an end view of the cutter head.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a cutter head 10 (FIG. 1) adapted to be installed in a rotary power tool such as a router (not shown) and adapted to releasably hold replaceable cutting blades 11 for shaping the edge portion of, for example, a wood or plastic workpiece (not shown).

The cutter head 10 includes a body 12 and a shank 14. The body is formed with front and back surfaces 15 and 16 (FIG. 3), respectively, and with a generally radially facing outer periphery which defines a substantially circular cross-section. The shank extends rearwardly from the center of the back surface and is sized to be received into a chuck or a collet of the rotary power tool such that the shank portion establishes the axis of rotation for the cutter head. Alternately, the body may be formed with a centrally located hole suitable for mounting to an arbor or a spindle of the power tool. The cutter head shown is adapted to be rotated in a counter-clockwise direction when viewed from the front of the cutter head (see FIG. 4).

The blades 11 are formed from relatively thin (e.g., 0.093 inch), hardened steel and are ground with relatively sharp cutting edges 18 for engaging and cutting the edge portion of the workpiece. The distance between the base 19 of each blade and the cutting edge of that blade are precisely controlled during the manufacture of the blades to facilitate alignment of the cutting edges in the cutter head as discussed below. The blades may be formed with straight cutting edges or, as shown, they may be formed with profiled cutting edges for forming the edge portion of the workpiece to a predetermined shape.

The blades 11 are secured into recesses 20 (FIG. 2) which extend generally radially inwardly from the outer periphery of the body 12 and which extend axially of the body. As a result, the recesses are defined, in part, by leading and trailing surfaces 21 and 22, respectively, (FIG. 6) which face generally circumferentially and generally toward one another. The blades are located in the recesses abutting the trailing surfaces of the recesses. The portions of the body defining the trailing surfaces are formed with a profile similar to the profile of the cutting edges 18 of the blades. In this way, the body provides relatively solid support for the blades as they engage the workpiece. In addition, gullets 24 are formed in the body adjacent to and on the leading sides of the recesses. The gullets provide clearance for the chips generated by the blades as the blades cut the edge portion of the workpiece.

The base of each recess 20 is formed with a generally radially outwardly facing surface or registry 25 which is precisely positioned relative to the center of the cutter head 10. The registry may be formed substantially perpendicular with respect to the trailing surface 22 of the recess or, as shown, it may be formed at an oblique angle relative to the trailing surface. When a blade 11 is installed into the recess, the base 19 of the blade rests on the registry so that the cutting edge 18 of the blade is precisely and repeatably positioned relative to the center of the cutter head.

Figure 5:
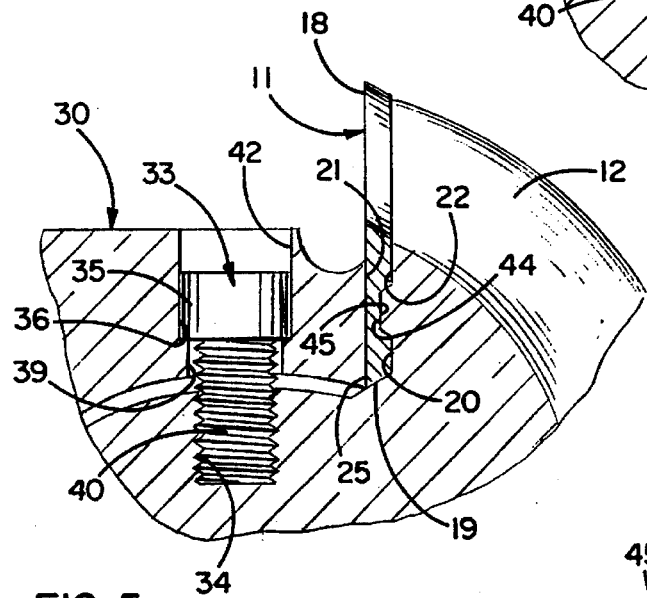
FIG. 5 is an enlarged fragmentary cross-sectional view taken substantially along the line 5—5 of FIG. 3.
Figure 7:
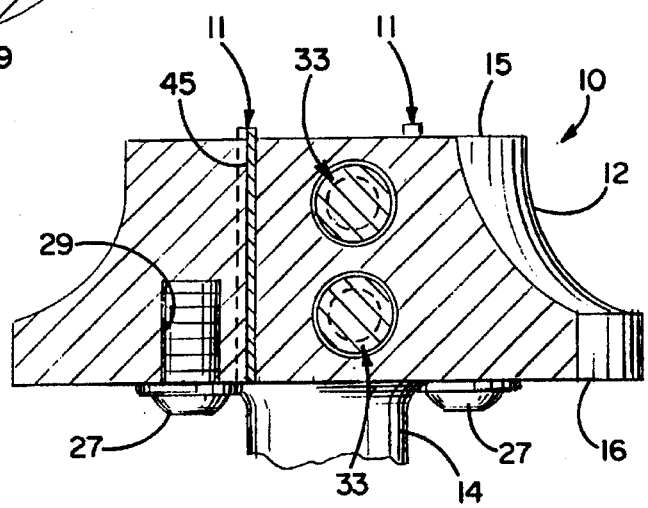
FIG. 7 is an enlarged cross-sectional view taken substantially along the line 7—7 of FIG. 4.

In accordance with one aspect of the invention, the body 12 of the cutter head 10 is formed with integral clamping portions or arms 30 which are selectively movable between clamping positions (FIG. 5) and release positions (FIG. 6) relative to the blades 11 in the recesses 20. Each blade may be slidably inserted into or removed from the recess when the corresponding arm is in the release position. The blade is securely held in the recess when the corresponding arm is in the clamping position. The arm is resiliently biased to the release position but is selectively moved to the clamping position by simply turning screws 33 inwardly relative to the center of the cutter head. The arm resiliently returns to the release position when the screws are turned outwardly. As a result, the blades can be quickly installed into, secured in, and removed from the cutter head.

More specifically, each arm 30 is defined by an outer peripheral portion of the body 12. The arm is substantially separated from and is generally spaced radially outwardly from the center portion of the body but is formed with an end portion which is integrally connected to the center portion of the body by a relatively narrow, axially extending strip of material. This narrow strip of material defines an integral hinge 31 which is sized to elastically stretch so as to allow the arm to resiliently pivot radially inwardly and outwardly. The arm is further formed with a free end portion located oppositely of the integral hinge. The free end portion defines a portion of one of the sides of the recess 20. The arm is preferably located on the leading side of the recess with the free end portion preferably defining the entire leading surface 21 of the recess. With this arrangement, the leading surface of the recess approaches and recedes from the trailing surface as the arm pivots inwardly and outwardly, respectively.

The integral hinge 31 is adapted to bias the leading surface 21 of the recess 20 to a position relative to the trailing surface 22 such that the recess is sized to slidably receive the blade 11. As a result, the integral hinge biases the arm 30 radially outwardly to the release position. In addition, the screws 33 are threaded into threaded openings 34 in the center portion of the body. The heads 35 of the screws engage radially outwardly facing surfaces 36 formed on the arm between the free end portion and the integral hinge. As a result, the screws drive the arm radially inwardly from the release position and cause the leading surface of the recess to clamp the blade against the trailing surface 22 as the screws are turned inwardly in the threaded openings. Accordingly, the screws are operable to selectively move the arm from the release position to the clamping position.

In carrying out the invention, the arm 30 is defined by forming an elongated slot 37 in the body 12 of the cutter head 10. The slot extends from the base of the recess 20 and in the same general direction as the direction of rotation of the cutter head. The slot is formed with a closed end which is adjacent the outer periphery of the body. The integral hinge 31 is defined by the material which is located generally radially outwardly of the closed end of the slot. The closed end of the slot is preferably formed with a relatively large radius to define an enlarged, strain relief opening for reducing the stress concentration at the closed end of the slot due to the flexing of the integral hinge.

The shape of the slot 37 is not critical in carrying out the invention, but may be formed with any suitable curvature. For example, to aid in forming the registry 25, the slot shown extends from the base of the recess 20 having an initial angle which is equal to the angle of the registry relative to the trailing surface 22 of the recess. The slot then extends with a curvature which is greater than the general curvature of the outer periphery of the body 12. Alternately, the slot may be formed extending in a straight line from the recess.

Figure 6:
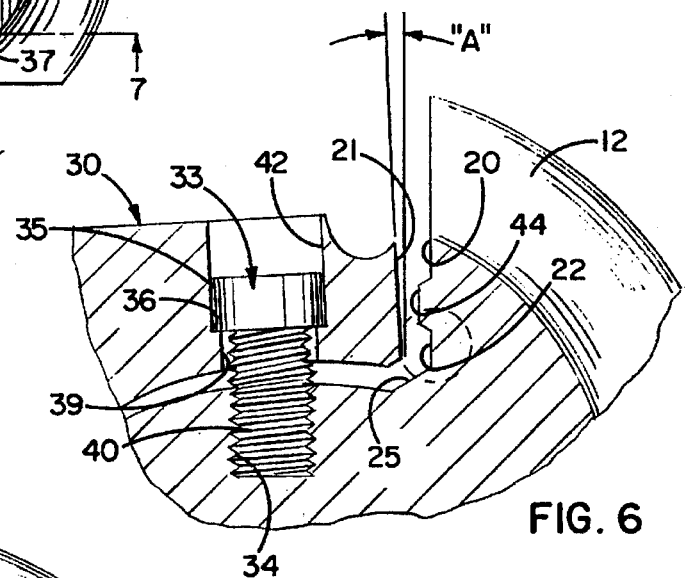
FIG. 6 is a view similar to FIG. 5 but shows a clamping portion in a release position and with the cutting blade removed.

The width of the recess 30, i.e., the distance between the leading surface 21 and the trailing surface 22, is precisely controlled within relatively tight tolerances. Specifically, the recess is sized to slidably but snugly receive the blade 11. The integral nature of the hinge 31 limits the movement of the arm 30. The relatively small clearance between the sides of the recess and the blade enables the hinge to stretch within the elastic limit of the hinge material as the arm moves from the release position to the clamping position. As shown in FIG. 6, the leading surface is inclined at a small angle as indicated by "A" relative to the trailing surface when the arm is in the release position. In this instance, the angle "A" reduces to zero and the leading surface is parallel with the trailing surface after the arm has been pivoted to the clamping position. Alternately, the leading surface of the recess initially may be substantially parallel to the trailing surface. Advantageously, the recess and the slot 37 may be formed in the same manufacturing operation if they are formed by electrical discharge machining.

In further carrying out the invention, each arm 30 is formed with holes 39 sized to slidably receive the threaded shank portions 40 of the screws 33. The holes 39 are located between the free end portion and the integral hinge 31 and extend generally radially through the arm. The threaded openings 34 in the center portion of the body are aligned with the holes 39 in the arm. To prevent the heads 35 of the screws from extending outwardly beyond the outer periphery of the body 12, the holes 39 are formed with counterbores 42 sized to receive the heads of the screws. The surfaces 36 are defined by the bottoms of the counterbores.

Advantageously, the cutter head 10 is equipped with screws 26 for establishing the location of the backside of the blades 11 relative to the back surface 16 of the body 12. More specifically, the screws 26 are screwed into threaded openings 29 extending forwardly and axially from the back surface of the body. The threaded openings are located adjacent the recesses 20 and are positioned such that the heads 27 of the screws 26 extend substantially across the recesses. When the back sides of the blades are aligned with the back surface of the body, the profiled cutting edges 18 of the blades are axially aligned relative to one another so as to evenly engage the edge portion of the workpiece.

With the foregoing arrangement, the cutter head 10 is especially adapted for ease of installation and removal of the blades 11. With the screws 33 sufficiently backed out of but remaining threaded into the threaded openings 39, the integral hinge 31 resiliently draws the leading surface 21 of the recess 20 away from the trailing surface 22 of the recess to provide clearance in the recess for receiving the blade. The blade is located and aligned in the recess by simply sliding the blade into the recess until the base 19 of the blade rests against the registry 25 and until the backside of the blade abuts the head 27 of the screw 26. When the screws 33 are turned inwardly, the heads 35 of the screws 33 engage the bottoms 36 of the counterbores 42 and cause the arm 30 to pivot inwardly about the integral hinge. As a result, the gap between the blade and the sides of the recess closes so that the leading surface clamps the blade against the trailing surface. Advantageously, if the leading surface is at a predetermined angle "A" when the arm is in the release position, the entire leading surface pivots into engagement with the blade when the screws 33 are turned inwardly. Applying a preload torque to the screws 33 firmly clamps the blade in the recess. To release the blade from the recess, the screws 33 are simply turned outwardly to allow the hinge portion to pull the leading surface away from the blade.

Further in accordance with the invention, the recess 20 is preferably formed with an integral tab 44 and the blade 11 is formed with an axially extending slot 45 which is sized to slidably receive the tab. More specifically, the tab extends axially along the trailing surface 22 of the recess and generally parallel to the registry 25. The tab projects into the recess toward the leading surface 21 and locally restricts the width of the recess. The tab preferably extends along the entire trailing surface to allow the recess, the slot 37, and the tab to be formed in the cutter head 10 during a single electrical discharge machining operation. With this arrangement, the blade is installed into the recess by aligning the slot 45 with the tab and sliding the blade axially into the recess until the blade engages the head 27 of the screw 26. As a result, the tab prevents the blade from flying out of the cutter head in the event that the screws 33 loosen when the cutter head is rotating.

From the foregoing, it will be apparent that the present invention brings to the art a new and improved cutter head 10 in which the blades 11 are more easily installed into and releasably secured in recesses formed in the cutter head when compared to prior cutter heads of the same general type. The uniquely configured arms 30 which are connected to the body 12 by way of integrally formed resilient hinges 31 enable the blades to be clamped into and released from the recesses 20 by simply turning screws 33 inwardly and outwardly, respectively. By virtue of the relatively snug fit between the blades and the recesses, and by virtue of the heads 27 of the screws 26 located on the backside 16 of the cutter head, the blades are easily located in the recesses and repeatably aligned relative to one another. As a result, dull blades can be more quickly removed and replaced with sharp blades without the need to remove and reinstall the screws or other items from the cutter head. In addition, the uniquely configured tabs 44 restrict the radial movement of the blades when they are located in but not firmly clamped in the recesses without the need for separate back-up screws.

We claim:

1. A rotary cutter head for holding a cutting blade, said cutter head comprising a body having a first opening for receiving the blade, the first opening comprising a slot formed between a fixed surface of the body and a movable surface of a clamp, said clamp being integrally formed with said body and being defined by a second opening intersecting the first opening and defining a resilient hinge joining the clamp to the body, adjustment means for urging the clamp toward the body about the hinge and being adjustable to close the hinge and thereby decrease the size of said first opening when clamped, and to allow the hinge to open said first opening when unclamped, said first opening being sized to slidably receive said blade when said adjustment means is unclamped, said blade being clamped in said first opening when said adjustment means is clamped.

2. A rotary cutter head as defined in claim 1 in which said clamp is resiliently biased by the resilient hinge to said unclamped position.

3. A rotary cutter head as defined in claim 2 in which (i) said clamp is formed with an opening, (ii) said body is formed with a threaded opening aligned with said opening in said clamp, and (iii) said adjustment means includes a threaded fastener having an enlarged head and having a shank portion extending from said head, said opening in said clamp being sized to slidably receive said shank portion but not said head, said shank portion extending through said opening in said clamp and having a threaded free end portion threaded into said threaded opening when said clamp is unclamped, said head engaging said clamp such that said head drives said clamp from said unclamped position to said clamped position as said fastener is rotated inwardly in said threaded opening.

4. A rotary cutter head as defined in claim 1 in combination with said blade, said cutter head being adapted to be rotated about a predetermined axis, said body having first and second oppositely facing sides and having a generally radially facing outer periphery, said first opening extending inwardly from said outer periphery and opening axially out of one of said sides, said body further including an integrally formed and axially extending tab portion projecting into said first opening so as to restrict said first opening, said blade being formed with a slot sized to slidably receive said tab portion as said blade is slid axially into said first opening from said one side such that said tab portion restricts radial movement of said blade in said first opening.

5. A rotary cutter head as defined in claim 4 further comprising means for restricting axial movement of the blade toward the other of said sides as the blade is slid into said first opening from said one side.

6. A rotary cutter head as defined in claim 5 in which said first opening extends axially between said sides, said restricting means including a threaded fastener threaded into said body and having an enlarged head portion abutting said other side and at least partially blocking said first opening at said other side.

7. A rotary cutter head for releasably holding a cutting blade, said cutter head being adapted to be rotated about a predetermined axis, said cutter head comprising a body portion having a generally circumferentially facing blade slot for slidably receiving a cutting blade, the blade slot being formed between a relatively fixed surface of the body and relatively deflectable surface of a clamp, the clamp being an integral part of the body defined by a thin hinged slot intersecting the blade slot and defining a resilient hinge for movement of the clamp toward or away from the body, the clamp having at least one opening aligned with an associated locking opening in the body, a fastener in the openings adapted to draw the clamp to the body about the hinge to clamp the blade in the blade slot, releasing of the fastener serving to allow the hinge to deflect sufficiently to allow slidable movement of the blade in the blade slot for adjustment thereof, said hinge having sufficient resilience to allow the blade to be slidably removed from the blade slot for replacement without removing the fastener from the locking opening.

8. A rotary cutter as defined in claim 7 in which a plurality of openings are provided in the clamp and a corresponding plurality of locking openings in the body, and the plurality of fasteners having enlarged head portions and having shank portions extending from the head portion, each shank portion extending through the opening in the clamp and having an end portion engaged with the locking opening the openings in the clamp being sized to slidably receive the shank portion but not the head portion of the associated fastener, the head portions engaging the clamp such that the head portions draw the clamp against the body to close the hinge and clamp the blade in the blade slot.

9. A rotary cutter as defined in claim 8 wherein the fasteners are threaded fasteners having threaded portions at the ends thereof, and the locking openings are threaded to match the thread of the fasteners.

10. A rotary cutter head as defined in claim 7 in which said deflectable surface of said clamp is at an angle relative to said fixed surface of said body when said clamp is closed to clamp the blade.

11. A rotary cutter head as defined in claim 7 in combination with said blade, said slot extending axially through said body portion, said body portion further including an integral tab portion extending axially along said surface of said body portion and projecting toward said surface of said clamp so as to restrict the width of said slot, said blade being formed with a recess sized to slidably receive said tab portion as said blade is slid axially into said slot such that said tab portion restricts radial movement of said blade in said slot.

12. A rotary cutter head as defined in claim 11 further comprising means for restricting lateral movement of the blade in one direction after the blade has been slid a predetermined distance into said slot in said one direction.

* * * * *